US United States Patent [19]
Carney

[11] 3,850,248
[45] Nov. 26, 1974

[54] METHOD OF USING A SPACER FLUID FOR SPACING DRILLING MUDS AND CEMENT

[75] Inventor: Leroy I. Carney, Duncan, Okla.
[73] Assignee: Halliburton Company, Duncan, Okla.
[22] Filed: Nov. 19, 1973
[21] Appl. No.: 417,431

[52] U.S. Cl. .............................. 166/291, 252/8.5 P
[51] Int. Cl. .............................................. E21b 43/16
[58] Field of Search .......... 166/291, 285; 252/8.5 P, 252/8.55 A

[56] References Cited
UNITED STATES PATENTS

| | | | |
|---|---|---|---|
| 2,380,156 | 7/1945 | Dobson et al. | 252/8.5 P |
| 3,002,923 | 10/1961 | Barker et al. | 252/8.5 P |
| 3,232,870 | 2/1966 | Cowan et al. | 252/8.5 P X |
| 3,244,638 | 4/1966 | Foley et al. | 252/8.5 P |
| 3,492,228 | 1/1970 | Kim | 252/8.5 P |
| 3,622,513 | 11/1971 | Miller | 252/8.5 P |
| 3,625,286 | 12/1971 | Parker | 166/291 |
| 3,799,874 | 3/1974 | Parker | 166/291 X |

*Primary Examiner*—Stephen J. Novosad
*Attorney, Agent, or Firm*—Fred E. Hook; John H. Tregoning

[57] ABSTRACT

A spacer fluid emulsion comprising approximately equal volume parts of a hydrocarbon oil and fresh water, and containing from about 15 pounds per barrel to about 40 pounds per barrel of an emulsifier, about 0.5 pounds per barrel to about 10 pounds per barrel of a strong surfactant-dispersant, and a weighting material in an amount effective to impart a density to the spacer fluid of from about 8 pounds per gallon to about 20 pounds per gallon. The emulsifier used comprises an oleyl amide, preferably in admixture with oleic acid and dimerized oleic acid, adsorbed on a solid carrier selected from the group consisting of lime, as herein defined, and diatomaceous earth. The surfactant-dispersant preferably comprises a mixture of about equal weight parts of waste sulfite liquor, and the reaction product derived from the reaction of oleyl chloride and n-methyltaurine. The invention is further directed to methods of using such spacer fluids between cement and drilling fluids during well completions.

4 Claims, No Drawings

3,850,248

METHOD OF USING A SPACER FLUID FOR SPACING DRILLING MUDS AND CEMENT

Problems associated with the cementing of well casings and deep liners in a well bore have confronted the oil and gas industry for many years without optimum solution. Generally, after completion of drilling of the bore hole, the drilling mud employed is displaced by the cement to be employed in cementing the casing. The compositions and properties of drilling muds and cements have varied widely, with the result that the interfacial contact between the displacing cement and an incompatible drilling fluid has often resulted in severely detrimental physical and chemical interactions which are the genesis of many of the problems encountered.

For example, where a high viscosity, high density drilling fluid is used, the described incompatibility can contribute to failure to obtain a satisfactory bond between the cement and the bore hole. Where a water based drilling fluid is in use, adequate removal of the mud and mud cake from the bore hole is difficult. When oil based (invert) drilling fluids are used, the incompatibility often results in contamination or intermingling of the mud with the cement, and of the cement with the mud. Extreme viscosities of the mud often arise from such commingling, causing surge pressures and pumping problems. In some cases this leads to undesirable formation breakdown. When the solids are commingled with the cement, premature setting of the cement is often induced and, conversely, when drilling fluids are contaminated with solids from the cement slurry, the properties advantageously characteristic of drilling fluids are adversely affected. For example, drilling fluids of the invert emulsion type (oil base) can be caused to have the emulsion broken, giving higher viscosities and higher pump requirements.

Because of the described difficulties which arise from direct displacement of drilling fluids with cements in the utilization of drilling mud slurries and oil well cements when completing and cementing a well, it has become a frequent practice to undertake to separate these two incompatible slurries by positioning a spacer fluid therebetween. Many different types of spacer fluids have been utilized, and in some instances, several types of spacer fluids are used in a single system for one displacement job. This requires a considerable amount of expensive equipment and specialized handling personnel. Various types of oleaginous materials have been used for spacer fluids between cement and oil base muds. Such spacer oils do not allow the cement to adequately hydrate, and the oil thins the mud. Further, the oil spacer cannot be weighted up to match the density of the mud in order to effect efficient removal thereof. Moreover, the inability to weight any of the oil type spacer fluids causes underbalance of the hydrostatic column in the annulus of the well. Generally, it is desirable and advantageous to have the spacer fluid slightly heavier than the mud that it is displacing, and the cement slightly heavier than the spacer fluid, and this is very difficult to achieve with many types of spacer fluids which have been used.

In view of the persistence of the described problems, one or more of which may be encountered when it is attempted to use any one of the spacer fluids heretofore proposed, a serious need continues to exist for a single, universal spacer fluid that can be employed effectively between any types of mud and cement slurries. Ideally, such universal spacer fluid could preferably be employed without significant alteration in the rheological properties of the drilling mud or cement, and without changing the pumping time required on the cement slurries in use.

By the present invention, improved, substantially universal spacer fluids are provided having excellent temperature and pressure stability, and effectively capable of spacing cements from substantially all mud systems employed in the drilling of oil and gas wells. Thus, the spacer fluids of the invention are compatible with water base mud systems of the ferro-chrome lignosulfonate and polymeric types, and are also compatible with oil base mud systems in all the weight ranges over which such systems are customarily used. In different terms, the slurry of the invention is compatible with substantially all oil-in-water emulsions, as well as all water-in-oil emulsions. Spacer fluids of the invention are compatible with the types of cements commonly in use for oil well cementing, and do not increase their viscosities or change the pumping times required.

It should also be pointed out that while the major and most frequent use of the slurries of the invention is as a spacer fluid between cements and drilling muds, the spacer fluids of the invention can also be used between any two drilling muds where one is being displaced by the other. The spacer fluids contemplated by the invention can be weighted to any desired density over a wide range, and can be easily tailored to have a density between the density of the drilling fluid and the density of the cement slurry in the system in which the spacer fluid is to function.

The spacer fluids of the invention are basically fresh water-in-oil emulsions containing approximately equal volume parts of a hydrocarbon oil and water, and further containing from about 15 pounds per barrel to about 40 pounds per barrel of an emulsifier, about 0.5 pounds per barrel to about 10 pounds per barrel of a strong surfactant-dispersant, and, in most usages, a weighting material in an amount effective to impart a density to the spacer fluid of from about 8 pounds per gallon to about 20 pounds per gallon.

Turning to a more specific description of the several components of the spacer fluids of the invention, and of the manner in which such fluids are preferably formulated, the water utilized in the spacer fluid is fresh water. This term is used in contrast to water having a high dissolved inorganic salts content, and particularly a significant content of chloride salts. The fresh water of the invention can be defined as water having an overall dissolved chloride salts content of less than about 1,000 ppm, and a total hardness of less than 500 ppm.

The oil utilized in preparing the emulsion is a hydrocarbon oil which can conveniently be diesel oil, crude oil, kerosene and various other hydrocarbons or mixtures or hydrocarbons. Diesel oil constitutes the presently preferred oil component.

The oil and fresh water are utilized in the spacer fluids of the invention in volume ratios of from about 40:60 to about 60:40 oil to water. Preferably, from about 45 parts by volume to about 55 parts by volume of oil are combined with from about 55 to about 45 parts by volume of water. In general, the most suitable spacer composition for most uses will contain about equal volumes of water and oil. In any case, the spacer fluid will be a relatively weak (balanced) water-in-oil (invert) emulsion. In other words, the interfacial tension forces in the emulsion are balanced so that the emulsion can easily flip and become an oil-in-water emulsion to maintain compatibility with a water base mud when it is used adjacent such drilling muds. The "balance" of the spacer fluid emulsions of the invention is an important factor in permitting them to be compatible with substantially all drilling muds and cements currently in use.

Where the amount of oil used in the spacer fluid exceeds a volume ratio to water of about 1.5:1, we have observed that the cement adjacent the spacer undergoes an undesirable reduction in setting time. Where the ratio drops below about 1:1.5, the ability to maintain the continuity of the oil phase is lost, and the fluid becomes an oil-in-water emulsion. The ability to vary the oil-to-water ratio within the specified range imparts greater flexibility to the selective tailoring of the viscosity and weight of the spacer fluid. In this regard, it should be understood that as the term weight is used in this application and in the claims, other than where the terminology weight percent or parts by weight is being employed, it is used as a term of art referring in actuality to a density parameter, usually expressed in either pounds per barrel, or pounds per gallon.

The emulsifiers utilized in the spacer fluid of the invention are comprised basically of an oleyl amide absorbed on a particulated solid carrier material which is selected from the group consisting of lime and diatomaceous earth, or mixtures thereof. For the purposes of the present application, and as used in the claims appended to the specification hereinafter, the term lime is defined to include calcium oxide, calcium hydroxide, magnesium oxide or mixtures of these compounds. The term emulsifier as used herein also is used in a specialized sense as including both the solid particulate carrier material and all the particulate materials adsorbed on the surface thereof, even though only one or a few of the latter materials may function as an emulsifier per se.

The oleyl amide employed in the emulsifier is absorbed on the surface of the particulate substrate carrier material in an amount ranging from about 1 weight percent to about 20 weight percent, based on the total weight of emulsifier used in the spacer fluid. Preferably, from about 2 to about 10 weight percent of the oleyl amide is employed, with the most desirable amount of this compound most frequently utilized in the emulsifier being about 4.9 weight percent.

The oleyl amide here referred to is considered the primary emulsifying component in the compositions of the invention, and preferably is derived from reacting a fatty acid containing from 12 to 18 carbon atoms with an amine. The amide reaction product preferably contains from about 16 to about 22 carbon atoms, and from one to two amide groups. The most preferred single oleyl amide is that which is prepared by condensing oleic acid with diethanolamine.

The oleyl amide constituting the principle component of the emulsifier used in the spacer fluid of the invention functions to reduce the interfacial tension between the oil and water constituting the principle components of the spacer fluid emulsions, so that when the mixture is agitated, a water-in-oil emulsion is readily produced, and its stability is maintained over satisfactory periods of time. When less than about 1 weight percent of the oleyl amide is employed, an unsatisfactory reduction of the interfacial tension results, and it is difficult to obtain complete emulsification of the spacer fluid composition. The addition of amounts of oleyl amide exceeding 20 weight percent of the total weight of the emulsifier, in addition to being uneconomic, creates an excessive dispersion of the internal water phase in the continuous oil phase of the emulsion.

In addition to the oleyl amide, the emulsifiers used in the spacer fluid of the present invention preferably also include dimerized oleic acid adsorbed on the particulate substrate material, and present in an amount of up to about 30 weight percent of the total weight of the emulsifier. Preferably, from about 5 weight percent to about 15 weight percent is used. The dimerized oleic acid, when employed, functions to increase the viscosity of the spacer fluid, enabling it to be weighted with a variety of conventional weighting materials, such as barium sulfate, calcium carbonate, iron oxides, lead sulfides and cement solids, for selective adjustment of the weight (density) of the spacer over a wide range. When concentrations greater than about 30 weight percent of the dimerized acid are utilized in the emulsifier, the spacer fluid becomes undesirably thick and its viscosity increases pumping requirements to an undesirable level. For most weighted spacer fluid applications, an amount of about 10 weight percent has been found to be optimum.

It should be pointed out that in relatively low temperature environments of usage, and on occasions when very little or no weighting material is to be added to the spacer fluid, the dimerized oleic acid can be omitted from the emulsifier composition. These occasions are relatively rare, however, and in most instances, the dimerized acid will preferably be utilized.

Of lesser importance for inclusion in the emulsifier used in the spacer fluids of the invention, but imparting some desirable properties thereto, is oleic acid. Where oleic acid is employed, it is utilized in a range of from about 3 weight percent to about 15 weight percent of the total weight of the emulsifier. Preferably, from about 3 weight percent to about 10 weight percent of the oleic acid is used. The most suitable amount is about 5 weight percent. The addition of this material helps to stabilize the spacer fluid emulsion against breaking upon contact with salt containing subterranean waters, and particularly high brine content connate waters. It is also a very useful additive where the cement in use contains significant quantities of sodium chloride.

It should be pointed out that where oleic acid is included in the emulsifier composition, economic considerations will frequently dictate the use of undistilled dark oleic acid in admixture with red oil, rather than pure oleic acid. The undistilled dark oleic acid contains about 75 percent oleic acid, and lesser amounts of linoleic, linolenic, palmitoleic, palmitic, myristic, myristoleic and stearic acids. The red oil component of such undistilled dark oleic acid mixture is the residue which is produced in a conventional oleic acid distillation process, and contains the described oleic acid, as well as quantities of the other acids mentioned above, including a minor amount of some dimerized acids.

An emulsifier which has been found to be particularly effective in the spacer fluids of the invention is comprised of powdered slaked lime present in the emulsifier composition in an amount in the range of from about 55 weight percent to about 78 weight percent, and having, as the other components of the emulsifier adsorbed on the surface thereof, oleyl amide, derived from the condensation of oleic acid with diethanolamine, in an amount in the range of from about 3 weight percent to about 10 weight percent and dimerized oleic acid present in an amount in the range of from about 8 weight percent to about 12 weight percent.

The most preferred single emulsifier composition for use in the spacer fluids of the invention consists essentially of powdered slaked lime in an amount of about 68.1 weight percent, about 4.9 weight percent oleyl amide, undistilled oleic acid present in an amount of about 5 weight percent, red oil present in an amount of about 5 weight percent, and undistilled dimerized oleic acid present in an amount of about 10 weight percent.

In order, in some usages of the spacer fluids, to impart fluid loss control to the spacer fluids, it will occasionally be desirable to include in the composition, in addition to the emulsifier described, a conventional particulated solid asphaltic resin which is added to the spacer fluid composition in an amount in the range of from about 1 weight percent to about 20 weight percent, based on the weight of the emulsifier added. Usually, from about 10 to about 14 percent of an asphaltic resin will provide adequate fluid loss control on the infrequent occasions when this is a problem in the use of the spacer fluids of the invention. Suitable asphaltic resins include those which have a melting point between 250° and 400° F. They may be kettle bottoms, air blown resins or naturally occurring resins. Where such asphaltic resins are used, as little as about 55 weight percent of the lime carrier can be utilized.

In addition to the emulsifier incorporated in the spacer fluid of the invention, and constituted as described above, the spacer fluid further includes a strong surfactant-dispersant material. This component of the spacer fluid composition functions to disperse and suspend particulated solid weighting materials in the spacer when such are utilized, and also functions to prevent solid components which may enter the spacer fluid from either the drilling mud or the cement, between which it is positioned, from breaking or detrimentally affecting the emulsion. A variety of surfactant-dispersants can be used, including sulfonated paraffins, resin acids and resin soaps (such as disproportionated resin acids derived from the kettle bottoms produced in the distillation of tall oils, and the soaps of such acids), and also mixtures of sulfonated lignin with certain particular oleyl amides differing in the manner hereinafter described from the oleyl amides included in the emulsifier. Such dispersing agents are incorporated in the spacer fluid in an amount from about 0.5 to about 10 pounds per barrel. Preferably, the amount of the surfactant-dispersant utilized is from about 2 pounds per barrel to about 8 pounds per barrel. When the most preferred surfactant-dispersant, hereinafter described, is employed, the amount utilized in the spacer fluid is most suitably about 4 pounds per barrel.

The preferred surfactant-dispersant compositions are those constituted by mixing a sulfonated lignin, such as waste sulfite liquors, with an oleyl amide derived from the reaction of oleyl chloride with an amino sulfonic acid containing from 2 to 5 carbon atoms. A surfactant-dispersant which has been found to be particularly suitable and highly effective in the spacer fluid compositions, and which constitutes the preferred dispersing agent for use in accordance with the present invention, is a product prepared by reacting oleyl chloride with n-methyltaurine, and then mixing this reaction product, constituting an oleyl amide, with waste sulfite liquor in an amount in the range of from about 25 weight percent to about 75 weight percent of the sulfite liquor-oleyl amide mixture. Most suitably, the oleyl amide reaction product and the sulfite liquor are mixed in substantially equal amounts. The mixture as thus formed is spray dried to form a solid, particulate composition. The term "waste sulfite liquor" is used herein to mean the waste liquor containing lignin sulfonates produced in the sulfite paper process or kraft lignins which have been sulfonated.

In addition to functioning to disperse and aid in suspending solid particles which may enter the spacer fluid from the adjacent cement slurry, or from the drilling mud spaced therefrom, the surfactant-dispersant utilized in the spacer fluid allows such conventional weighting materials as particulated solid quartz, calcite, barite, iron oxide, etc. to be rapidly dispersed in the water-in-oil emulsion constituting the spacer fluid. It has been found that the spacer fluids containing the described components (emulsifier and surfactant-dispersant) are capable of dispersing and suspending weighting materials in an amount sufficient to impart a weight of from about 8 pounds per gallon to about 20 pounds per gallon to the spacer fluid.

In formulating the spacer fluid emulsion of the invention, the emulsifier material is first added to the oil. A fluid loss additive, such as the asphaltic resins hereinbefore mentioned, can be concurrently or later added, if used. After the solid emulsifier and fluid loss additive materials, if any, have been added to the hydrocarbon oil, the solids are thoroughly dispersed in the oil, and the fresh water is then added to the slurry to form a water-in-oil emulsion. After the emulsion has formed, the previously described amount of the surfactant-dispersant material is added to complete the spacer fluid, except for the addition of any weighting materials which will be used.

The spacer fluids as thus prepared are weaker emulsions, in general, than the drilling fluids which they function to space from various cement compositions. Since the spacer, though a water-in-oil emulsion, is closely balanced by the use of approximately equal amounts of the dispersed and continuous phase, "the emulsion can revert to an oil-in-water emulsion if it contains an excessive quantity of water." In other words, in the event that a water based drilling mud is being employed, water from the drilling mud will tend to overload the water phase in the spacer fluid, causing it to revert, and become an oil-in-water emulsion. It will thus maintain its compatibility with the mud, as well as with the cement. The use of the powerful surfactant-dispersant material in the spacer fluid permits it to be weighted as may be desired over a wide range of from about 8 pounds per gallon to about 20 pounds per gallon, and this material also functions to oil wet any cement solids that may migrate into the spacer fluid from the adjacent cement slurry. Further, the spacer fluids are compatible with all types of cement slurries utilized in the cementing of wells upon completion, and does not increase the viscosity or change the pumping time of such cements.

In use, the spacer fluid of the invention is pumped into a well being completed behind the drilling mud to circulate the mud out of the well, and is displaced ahead of the cement column circulated into the well for cementing purposes. It will generally be preferred to weight the spacer fluid to a weight which is slightly heavier than the weight of the drilling mud that it is displacing, and slightly lighter than the cement which follows the spacer.

The following examples are presented to further illustrate and explain the spacer fluid compositions of the invention, and the function of certain components thereof. In all of the following examples, reference to the preferred surfactant-dispersant refers to a mixture of equal weight parts of waste sulfite liquor and an oleyl amide derived from the reaction of oleyl chloride with n-methyltaurine.

EXAMPLE 1

A 21,000 foot well is drilled in a California location, and has a bottom hole circulating temperature of 310° F. In completing the well, the mud used in drilling the well is displaced through the annulus between the casing and the well bore by the use of a spacer fluid interposed between the mud and the cement following the spacer fluid for purposes of cementing the casing. The mud employed has a density of 18 pounds per gallon, and is a lignosulfonate-containing water base mud. The cement used is an API Class G cement having a weight of 14.4 pounds per gallon, and is modified by the inclusion of small amounts of sodium chloride, silica flour, iron oxide and an appropriate retarder.

The spacer fluid formulated in accordance with the present invention and used between the cement and mud has a weight of 18.2 pounds per gallon achieved using barium sulfate as a weighting material. The spacer fluid emulsion contains water and oil in a 50-50 volume ratio, and has incorporated therein, 25 pounds per barrel of an emulsifier which contains 68.1 weight percent of powdered slaked lime having adsorbed on its surface, 4.9 weight percent oleyl amide derived from the condensation of oleic acid with diethanolamine, 5 weight percent undistilled oleic acid, 5 weight percent red oil, and 10 weight percent undistilled dimerized oleic acid. The spacer fluid also contains 4 pounds per barrel of the preferred surfactant-dispersant used in the spacer fluids of the invention. Finally, the spacer fluid used contains 12 weight percent of an asphaltic resin incorporated to reduce fluid loss.

The mud and cement utilized in the California cementing run are not compatible. Fifty barrels of the spacer is used between the mud and cement.

The critical velocities at which the transition from laminar to turbulent flow occurs are measured and evaluated for the drilling mud alone, the spacer fluid alone, a mixture of the spacer fluid and the cement used, and a mixture of spacer fluid and the drilling mud. The temperature at which the critical velocity tests are carried out is 200° F. The critical velocities are measured for various annulus sizes as determined by the difference in the hole diameter and the casing outside diameter. The results of these runs are set forth in Table I.

TABLE I

| Hole Dia. Minus Casing O.D., Inches | Critical Velocity - Feet per Minute | | | | | |
|---|---|---|---|---|---|---|
| | 1 | 2 | 3 | 4 | 5 | 6 |
| Drilling Mud | 470 | 370 | 320 | 290 | 270 | 250 |
| Spacer Fluid | 355 | 230 | 175 | 145 | 125 | 115 |
| Spacer Fluid + 50% Cement | 325 | 240 | 205 | 180 | 165 | 150 |
| Spacer Fluid + 50% Mud | 340 | 250 | 210 | 185 | 170 | 155 |

The results of the critical velocity measurements indicate that substantially lower critical velocities obtain for mixtures of the spacer fluid with either cement or mud, than in the case of the mud alone. There is therefore no detrimental increase in viscosity, and a greater ease in achieving turbulent flow is realized where any significant mixing of the spacer fluid with either the mud or the cement occurs.

EXAMPLE 2

Certain tests are carried out preliminary to the completion of a well in East Texas. The well is 9,700 feet in depth, and has a bottom hole circulating temperature of 250° F. The mud used in drilling the well is 14 pounds per gallon oil base mud, and the API Class H cement to be used in completing the well has a density of 15.8 pounds per gallon. The cement includes 18 percent sodium chloride, a small amount of a commercially available friction reducer and a small amount of retarder.

A spacer fluid constituted as described in Example 1, but weighted by the use of barium sulfate to a weight of 14 pounds per gallon, is selected for placement between the mud and cement. To determine the effects on viscosity which might be expected to occur as a result of some contamination occurring at the interface between the spacer fluid and the mud, as well as between the spacer fluid and the cement, several tests are conducted with a Fann Viscosimeter, and the results of these evaluations are set forth in Table II.

TABLE II

| Contamination Tests 600/300 Fann Reading | Percent by Volume Contamination | | | | | |
|---|---|---|---|---|---|---|
| | 0 | 10 | 20 | 30 | 40 | 50 |
| Mud + Cement | 300+/300+ | 300+/276 | 300+/300+ | 300+/300+ | 300+/300+ | 300+/300+ |
| Mud + Spacer Fluid | 300+/260 | 300+/210 | 295/177 | 257/152 | 202/133 | 204/118 |
| Cement + Spacer Fluid | 63/30 | 59/33 | 62/37 | 61/38 | 58/38 | 56/36 |

The results appearing in Table II show that the viscosities developed in the Fann tests for the type of mixing which can conceivably occur at the interface between the spacer fluid and mud are much lower than those which would occur, without the use of the spacer, at the interface between the mud and cement. The same is true of the viscosities developed at the interface between the spacer fluid and the cement, assuming varying amounts of contamination up to a 50–50 volumetric ratio of contamination.

EXAMPLE 3

For the purpose of completing a 20,000 foot well drilled in Oklahoma, and having a bottom hole circulating temperature $f$ 300° F, a spacer fluid, constituted as described in Example 1, is made up in accordance with the present invention for placement between a water base, ferro chrome-lignosulfonate drilling mud having a density of 10.7 pounds per gallon, and a cement having a density of 12.8 pounds per gallon. The spacer fluid is weighted with barium sulfate to a weight of 11.5 pounds per gallon. Fann Viscosimeter tests of the type described in Example 2 are then carried out to examine the effects upon the viscosity of the system of the commingling or intermixing occurring at the interfaces of the spacer fluid with the cement and with the mud, as compared to the viscosity effect resulting from intermingling of the mud with the cement where no spacer fluid is employed. The results are set forth in Table III.

TABLE III

| Contamination Tests | Percent by Volume Contamination | | | |
|---|---|---|---|---|
| 600/300 Fann Reading | 20 | 30 | 40 | 50 |
| Mud + Cement | 133/82 | 156/94 | 182/109 | 230/135 |
| Mud + Spacer Fluid | 97/58 | 97/58 | 105/60 | 105/60 |
| Cement + Spacer Fluid | 33/22 | 32/20 | 27/17 | 26/17 |

EXAMPLE 4

An 18,000 foot well having a bottom hole circulating temperature of 283° F drilled in Louisiana, using an oil base mud having a density of 17.5 pounds per gallon, is to be completed with an API Class H cement having a density of 18.1 pounds per gallon. The cement contains an iron oxide weighting agent, silica flour and a small amount of commercially available retarder.

A spacer fluid is made up for interposition between the cement and mud, and has a weight of 16.8 pounds per gallon achieved by weighting with barium sulfate. The spacer fluid otherwise has the composition of the spacer fluid referred to in Example 1. Fann Viscosimeter tests are carried out on the spacer fluid in admixture with both the mud and the cement, and the results are compared with Fann viscosity readings carried out on various mixtures of cement and mud. The results are set forth in Table IV.

oleic acid and 525 pounds per barrel of barium sulfate as a weighting material. The amounts and kinds of solid carrier substrate material in the emulsifier composition is varied in the four compositions, as is the amount of surfactant-dispersant. These variations in composition are as follows:

Composition A – 20 lbs/bbl of calcium oxide and 4 lbs/bbl of the preferred dispersant-surfactant hereinbefore described;

Composition B – same as Composition A, but no lime or other solid carrier included;

Composition C – same as Composition B, except that 5 lbs/bbl of the preferred dispersant-surfactant are used;

Composition D – same as Composition A, except that 2 lbs/bbl of sodium hydroxide are used instead of the calcium hydroxide.

For the purpose of evaluating viscosities and determining the voltage breakdown characteristics of the spacer fluid compositions, voltage breakdown and Fann Viscosimeter tests are conducted on the Compositions A, B and C. Composition D does not make an emulsion, indicating that sodium hydroxide can not be substituted as a carrier material for the calcium hydroxide. The results of the viscosity and voltage breakdown tests are set forth in Table V.

TABLE V

| | Composition | | |
|---|---|---|---|
| | A | B | C |
| Apparent Viscosity | 95 | 150+ | 150+ |
| 600 Fann Reading | 190 | 300+ | 300+ |
| 300 Fann Reading | 140 | 300+ | 244 |
| Plastic Viscosity | 50 | — | — |
| Yield Point | 90 | — | — |
| 200 Fann Reading | 118 | 286 | 207 |
| 100 Fann Reading | 86 | 227 | 163 |
| 6 Fann Reading | 31 | 93 | 69 |
| 3 Fann Reading | 27 | 49 | 39 |
| Voltage Breakdown | 70 | 74 | 34 |

The results set forth in Table V show that eliminating the solid carrier (CaOH) results in the spacer fluid (Composition B) having a viscosity which is too high

TABLE IV

| Contamination Tests | Percent by Volume Contamination | | | | | |
|---|---|---|---|---|---|---|
| 600/300 Fann Reading | 0 | 10 | 20 | 30 | 40 | 50 |
| Cement + Mud | 300+/21 | 293/170 | 300+/250 | 300+/243 | 300+/276 | 300+/300+ |
| Mud + Spacer Fluid | 129/73 | 98/58 | 94/55 | 90/51 | 84/48 | 81/45 |
| Cement + Spacer Fluid | 224/132 | 194/116 | 116/105 | 155/100 | 137/83 | 157/93 |

EXAMPLE 5

Four spacer compositions are made up with each containing 108 ml. of No. 2 diesel oil and an equal volume of water. Each composition also contains 1.5 pounds per barrel of oleic acid; 1.5 pounds per barrel of oleyl amide (condensation product of oleic acid and diethanolamine); 1.5 pounds per barrel of dimerized for the spacer fluid to be usable. The addition of 25 percent more surfactant-dispersant to Composition C does not adequately lower the viscosity to correct this problem.

EXAMPLE 6

To a blend of 108 ml. of No. 2 diesel oil and 108 ml. of fresh water, various of the components of the spacer fluid composition of the invention are added, except for the oleyl amide of the emulsifier. Eight compositions are formulated in this way, and their voltage breakdown characteristics then determined. Table VI shows the constitution of the several compositions and the voltage breakdowns obtained.

TABLE VI

| Component | Composition, lbs/bbl | | | | | | | |
|---|---|---|---|---|---|---|---|---|
| | 1 | 2 | 3 | 4 | 5* | 6* | 7 | 8 |
| dimerized oleic acid | 2.5 | 2.5 | 2.5 | 2.5 | 1.5 | 1.5 | 3.5 | 2.5 |
| asphaltenes | — | 4.0 | 4.0 | 4.0 | 2.0 | 2.0 | 2.0 | — |
| dispersant-surfactant | — | — | 4.0 | 4.0 | 1.0 | 5.0 | 5.0 | 8.0 |
| barite | — | — | — | 525 | — | — | 525 | — |
| Voltage Breakdown** | 20 | 12 | 50 | — | 16 | 0 | — | — |

*The solid components are here all added together into the diesel oil which is then added to the fresh water.
**Compositions 4 and 7 are too thick to accept and allow mixing in of all the barite. In the case of Composition 8, the emulsion breaks during the adding of the barite.

The poor results realized when the oleyl amide emulsifying agent, used in the emulsifier, and the solid carrier (lime, etc.) are omitted demonstrate the imporatnce of the inclusion of these components.

EXAMPLE 7

A number of compositions are prepared each containing 151 ml. of No. 2 diesel oil, 151 ml. of fresh water and 110 pounds per barrel of 4.23 gravity barite. The other components of the compositions are varied as follows:

| Component | Composition, lbs/bbl | | | | | | | |
|---|---|---|---|---|---|---|---|---|
| | 1 | 2 | 3 | 4 | 5 | 6 | 7 | 8 |
| oleyl amide* | 1.5 | — | — | 1.5 | 1.5 | — | 1.5 | 1.5 |
| dimerized oleic acid | — | 2.5 | — | 2.5 | — | 2.5 | 2.5 | 2.5 |
| oleic acid | — | — | 2.5 | — | 2.5 | 2.5 | 2.5 | 2.5 |
| friction reducer** | — | — | — | — | — | — | — | 2.0 |

*reaction product of oleic acid and diethanolamine
**a derivative of dodecylbenzene sulfonic acid The Fann Viscosimeter and voltage breakdown tests previously described are carried out on the eight compositions. The results obtained appear in Table VII.

TABLE VII

| | Composition | | | | | | | |
|---|---|---|---|---|---|---|---|---|
| | 1 | 2 | 3 | 4 | 5 | 6 | 7 | 8 |
| 600 Reading | 40 | 174 | 53 | 175 | 58 | 80 | 83 | 77 |
| 300 Reading | 21 | 165 | 27 | 142 | 31 | 50 | 59 | 57 |
| Plastic Visc. | 19 | 9 | 26 | 33 | 27 | 30 | 24 | 20 |
| Yield Point | 2 | 156 | 1 | 109 | 4 | 20 | 35 | 37 |
| 200 Reading | 15 | 158 | 32 | 122 | 27 | 38 | 48 | 47 |
| 100 Reading | 10 | 137 | 23 | 96 | 14 | 25 | 35 | 35 |
| 6 Reading | 3 | 24 | 7 | 37 | 3 | 8 | 13 | 12 |
| 3 Reading | 2 | 18 | 5 | 32 | 2 | 5 | 10 | 8 |
| Voltage Breakdown | 72 | 100 | 100 | 60 | 62 | 100 | 60 | 20 |

The data in Table VII demonstrate the need for inclusion of the dimerized oleic acid in the composition in order to achieve adequate weight supporting capacity (yield point of at least 8), but further show that when used alone or at a relatively high concentration, the dimerized acid tends to increase the viscosity of the composition to a higher than optimum level.

EXAMPLE 8

Ten pounds per barrel of CaO are added to each of the eight compositions constituted as described in Example 7. Viscosity and voltage breakdown tests of the thus modified compositions yield the following results:

TABLE VIII

| | Composition | | | | | | | |
|---|---|---|---|---|---|---|---|---|
| | 1 | 2 | 3 | 4 | 5 | 6 | 7 | 8 |
| 600 Reading | 42 | 115 | 64 | 145 | 60 | 100 | 80 | 92 |
| 300 Reading | 22 | 82 | 37 | 114 | 35 | 70 | 55 | 67 |
| Plastic Visc. | 20 | 33 | 27 | 31 | 25 | 30 | 25 | 25 |
| Yield Point | 2 | 49 | 10 | 83 | 10 | 40 | 30 | 42 |
| 200 Reading | 15 | 72 | 27 | 95 | 25 | 60 | 45 | 55 |
| 100 Reading | 9 | 64 | 15 | 73 | 17 | 52 | 22 | 40 |
| 6 Reading | 3 | 11 | 4 | 30 | 5 | 14 | 11 | 14 |
| 3 Reading | 2 | 7 | 3 | 24 | 4 | 7 | 9 | 11 |
| Voltage Breakdown | 28 | 80 | 0 | 66 | 60 | 52 | 60 | 40 |

The properties of the spacer fluid emulsions are shown by the data to be generally improved by the addition of the particulate calcium oxide.

EXAMPLE 9

Nine spacer fluid compositions are prepared each containing equal volumes of No. 2 diesel oil and fresh water, and each containing 4 pounds per barrel of the preferred surfactant-dispersant (a mixture of equal weight parts of waste sulfite liquor and the methyl taurine derived oleyl amide). The remaining components of the several compositions are varied as shown in Table IX, which also shows the density, in pounds per gallon, of each of the resulting spacer fluids.

TABLE IX

| | Composition | | | | | | | | |
|---|---|---|---|---|---|---|---|---|---|
| | 1 | 2 | 3 | 4 | 5 | 6 | 7 | 8 | 9 |
| Diesel No. 2, ml. | 153 | 121 | 102 | 153 | 121 | 102 | 153 | 121 | 102 |
| Fresh Water, ml. | 153 | 121 | 102 | 153 | 121 | 102 | 153 | 121 | 102 |
| Emulsifier, lbs/bbl* | 25 | 25 | 25 | 20 | 20 | 20 | 15 | 15 | 15 |
| Barite, lbs/bbl | 110 | 375 | 537 | 110 | 375 | 537 | 110 | 375 | 537 |
| Density, lbs/gal | 10 | 15 | 18 | 10 | 15 | 18 | 10 | 15 | 18 |

*The emulsifier used has the following composition:

| Component | Weight Percent |
|---|---|
| calcium oxide | 56 |
| oleyl amide | 4 |
| oleic acid | 10 |
| dimerized oleic acid | 10 |
| dispersant-surfactant | 8 |
| asphaltenes | 12 |

The Fann Viscosimeter and voltage breakdown values for the compositions are determined, and are set forth in Table X.

TABLE X

| | Composition | | | | | | | | |
|---|---|---|---|---|---|---|---|---|---|
| | 1 | 2 | 3 | 4 | 5 | 6 | 7 | 8 | 9 |
| 600 Reading | 100 | 140 | 300+ | 71 | 146 | 282 | 58 | 112 | 300+ |
| 300 Reading | 69 | 85 | 190 | 45 | 88 | 162 | 33 | 61 | 171 |
| Plastic Visc. | 31 | 55 | — | 26 | 58 | 120 | 25 | 51 | — |
| Yield Point | 38 | 30 | — | 19 | 30 | 42 | 8 | 10 | — |
| 200 Reading | 55 | 62 | 143 | 34 | 64 | 116 | 24 | 44 | 129 |
| 100 Reading | 38 | 36 | 84 | 21 | 38 | 66 | 13 | 24 | 75 |
| 6 Reading | 8 | 6 | 11 | 3 | 4 | 9 | 2 | 3 | 10 |
| 3 Reading | 5 | 4 | 8 | 2 | 3 | 6 | 1.5 | 2 | 5 |
| Voltage Breakdown | 200 | 124 | 160 | 200 | 160 | 124 | 124 | 80 | 82 |

In the foregoing discussion and description of the invention, certain preferred embodiments of the invention have been described, and illustrative examples of the practice of the invention have been set forth in order to guide those skilled in the art to an understanding of the basic principles underlying the invention. Certain variations in the manner of using the spacer fluids of the invention will be perceived and well understood by those skilled in the art, and certain changes in the character and amount of components herein described, particularly in the working examples, will be apparent to those knowledgeable in the field to which the invention pertains. It is therefore intended that the spirit and scope of the invention, as based upon the underlying principles herein enunciated, shall be considered to circumscribe and include all such changes and innovations as do not depart from the basic principles of the invention, except as such scope may be necessarily limited by the appended claims or reasonable equivalents thereof.

What is claimed is:

1. A method for enhancing the completion of cased bore holes drilled into the earth using drilling mud comprising:

preparing a water-in-oil emulsion spacer fluid containing approximately equal amounts of hydrocarbon oil and fresh water, and further containing an effective amount of an emulsifier comprising a fatty acid amide of from 16 to 22 carbon atoms adsorbed on a solid particulate carrier;

incorporating in the spacer fluid, an effective amount of a viscosity increasing agent and a surfactant-dispersant to facilitate addition to the spacer fluid of the hereinafter described quantity of weighting material, said surfactant-dispersant comprising a mixture of waste sulfite liquor and an oleyl amide;

selecting a cementing composition for cementing the casing in the bore hole by placement of the cement in the annulus around the casing;

adding weighting material to said spacer fluid in a quantity sufficient to impart a weight to the spacer fluid which does not exceed the weight of said cementing composition, and is not less than the weight of the drilling mud used in drilling the bore hole;

circulating into said annulus in an upward direction in the bore hole and behind drilling mud in the annulus to displace the drilling mud, a quantity of said spacer fluid, followed by a quantity of said cementing composition, so that said spacer fluid is interposed between the cementing composition and drilling mud over a sufficient interval to prevent any intermixing of the cementing composition and drilling mud.

2. The method defined in claim 1 wherein from about 30 to about 50 barrels of said spacer fluid are interposed between the drilling mud and cementing composition.

3. The method defined in claim 1 wherein the emulsifier utilized in the cement comprises an oleyl amide derived from the condensation of oleic acid with diethanolamine, and wherein said solid particulate carrier is calcium hydroxide.

4. The method defined in claim 3 wherein said viscosity increasing agent is dimerized oleic acid, and said surfact-dispersant is a mixture of substantially equal weight parts of waste sulfite liquor and a reaction product of oleyl chloride with n-methyltaurine.

* * * * *